US012308735B2

(12) United States Patent
Gupta et al.

(10) Patent No.: US 12,308,735 B2
(45) Date of Patent: May 20, 2025

(54) POWER FACTOR CORRECTION CIRCUIT FOR A BOOST CONVERTER

(71) Applicant: Navitas Semiconductor Limited, Dublin (IE)

(72) Inventors: Milind Gupta, Irvine, CA (US); Chih-Hsien Hsieh, Irvine, CA (US); Jun Li, Irvine, CA (US)

(73) Assignee: Navitas Semiconductor Limited, Dublin (IE)

( * ) Notice: Subject to any disclaimer, the term of this patent is extended or adjusted under 35 U.S.C. 154(b) by 346 days.

(21) Appl. No.: 17/962,303

(22) Filed: Oct. 7, 2022

(65) Prior Publication Data
US 2024/0136918 A1 Apr. 25, 2024

(51) Int. Cl.
*H02M 1/42* (2007.01)
*H02M 1/08* (2006.01)

(52) U.S. Cl.
CPC .......... *H02M 1/4225* (2013.01); *H02M 1/08* (2013.01)

(58) Field of Classification Search
CPC ............ H02M 1/4225; H02M 1/0058; H02M 1/0054; H02M 1/385; H02M 1/0012; H02M 1/08; H02M 3/158
See application file for complete search history.

(56) References Cited

U.S. PATENT DOCUMENTS

| 7,881,076 | B2 | 2/2011 | Yang |
| 8,098,505 | B1 | 1/2012 | Choi |
| 10,999,905 | B2 | 5/2021 | Eum et al. |
| 2010/0110739 | A1* | 5/2010 | Nishikawa ......... H02M 1/4225 363/124 |
| 2012/0014148 | A1* | 1/2012 | Li ....................... H02M 1/4216 363/78 |
| 2019/0028022 | A1* | 1/2019 | Kim .................... H02M 1/4225 |

(Continued)

*Primary Examiner* — Kyle J Moody
*Assistant Examiner* — Jye-June Lee
(74) *Attorney, Agent, or Firm* — FisherBroyles, LLP

(57) ABSTRACT

A power factor correction circuit for a boost converter comprises a voltage converting means and a voltage-to-time converting means. The voltage converting means converts a supply voltage based on a time period of a turn-on duration $T_{on}$ and a turn-off duration $T_{off}$ of the boost converter into an output voltage. The voltage-to-time converting means generates the turn-on duration $T_{on}$ based on the output voltage from the voltage converting means. The power factor correction circuit adjusts the turn-on duration $T_{on}$ substantially in accordance with the following relationship:

$$T_{On} = \frac{T}{T_{on} + T_{off}} \frac{\text{first parameter}}{\text{second parameter}}$$

The first parameter includes at least one first process-dependent parameter and the second parameter includes at least one second process-dependent parameter. The first process-dependent parameter and the second process-dependent parameter are same electrical characteristic associated with different circuit components in the power factor correction circuit.

20 Claims, 8 Drawing Sheets

(56) References Cited

U.S. PATENT DOCUMENTS

2021/0091678 A1    3/2021   Wang et al.
2021/0234458 A1    7/2021   Leisten et al.
2021/0367507 A1   11/2021   Deng et al.

* cited by examiner

POWER FACTOR CORRECTION CIRCUIT FOR A BOOST CONVERTER

FIELD OF THE INVENTION

The present disclosure relates to a power factor correction circuit and more particularly to a power factor correction circuit for a boost converter.

BACKGROUND OF THE INVENTION

Power supplies are typically used to convert alternating current ("ac") power provided by an electrical outlet into usable direct current ("dc") power for an electrical device. One important consideration for power supply design is how efficiently power is delivered to the power supply. To improve power delivery efficiency a power factor correction (PFC) circuit may be used in the power supply, which attempts to shape the current waveform as closely to the shape of the voltage waveform.

Typically, PFC circuits are designed to include a power switch that is controlled to switch between an off state and on state in order to transform a distorted input current waveform transmitted from the distribution line into a more ideal current waveform that resembles the shape of the input voltage waveform. More specifically, the power switch is coupled to an energy transfer element to transfer energy to the output of the power supply. However, the PFC circuit experiences switching losses during operation that are created in the power switch due to parasitic capacitances. Typically, parasitic capacitance can be defined as an unwanted capacitance that exists between parts of an electrical component due to their proximity to each other. Additional losses are also realized in the energy transfer element.

Boost topology is very widely used for PFC since the input current is an inductor current. To have a good power factor the input current needs to be proportional to the input voltage and follow the sinusoidal shape of the input mains voltage. For a discontinuous mode boost operation, the switching control scheme is not easy to implement since it requires maintaining a ratio of a product of times to the total time period constant.

SUMMARY OF THE INVENTION

A power factor correction circuit for a boost converter according to an embodiment of the present invention comprises: a voltage converting means for converting a supply voltage based on a time period of a turn-on duration $T_{on}$ and a turn-off duration $T_{off}$ of the boost converter into an output voltage; and a voltage-to-time converting means for generating the turn-on duration $T_{on}$ based on the output voltage from the voltage converting means; wherein under a critical conduction mode, the power factor correction circuit is configured to adjust the turn-on duration $T_{on}$ substantially in accordance with the following relationship:

$$T_{on} = \frac{T}{T_{on} + T_{off}} \frac{\text{first parameter}}{\text{second parameter}}$$

The first parameter in numerator includes at least one first process-dependent parameter and the second parameter in denominator includes at least one second process-dependent parameter.

The first process-dependent parameter and the second process-dependent parameter are same electrical characteristic associated with different circuit components in the power factor correction circuit.

DETAILED DESCRIPTION OF THE PREFERRED EMBODIMENTS

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

As used herein, the term "and/or" includes any and all combinations of one or more of the associated listed items.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises", "comprising", "includes", and/or "including" when used herein specify the presence of stated features, elements, and/or components, but do not preclude the presence or addition of one or more other features, elements, components, and/or groups thereof. The indefinite articles and the definite articles shall encompass both the plural and singular unless the opposite is clearly apparent from the context.

In one aspect of the present invention, methods and apparatuses disclosed here for explanation purposes use a control technique to increase efficiency in a power factor correction (PFC) circuit. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Figure 1:
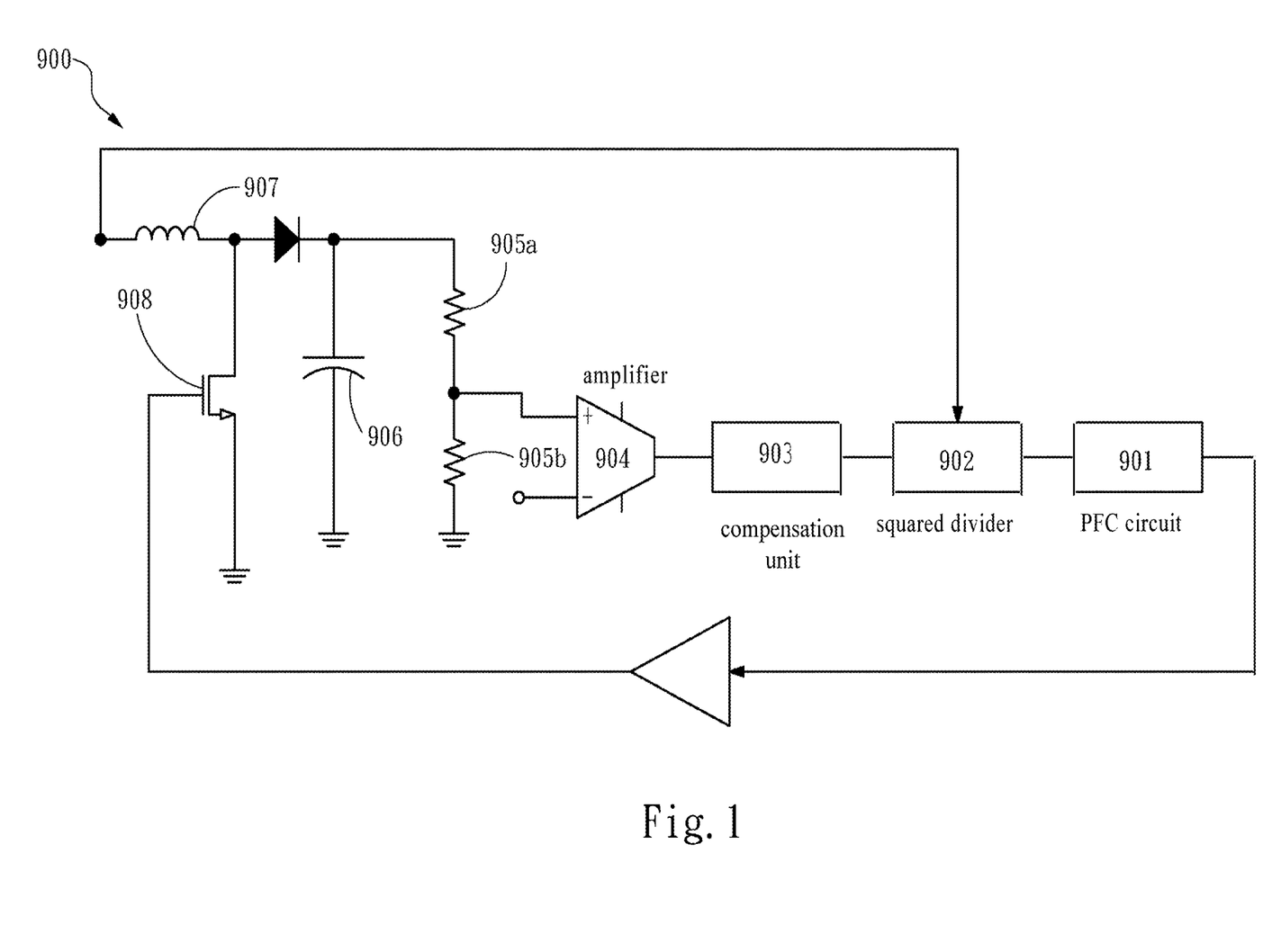
FIG. 1 shows a schematic diagram of an example of power factor correction system in accordance with embodiments of the present invention.
Figure 2:
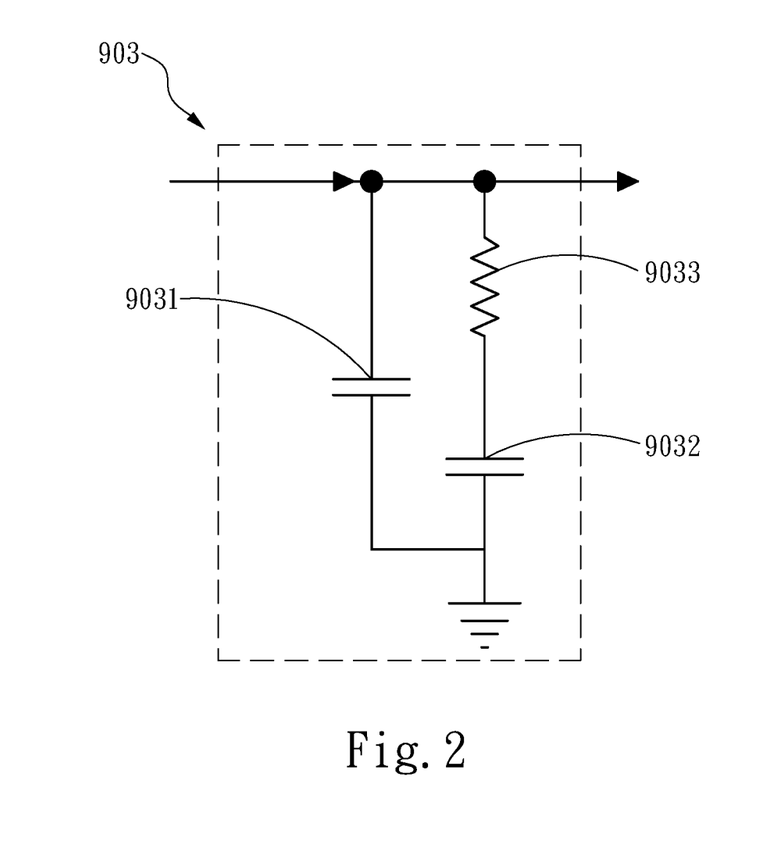
FIG. 2 shows a schematic diagram of an example of the compensation unit in FIG. 1.
Figure 3:
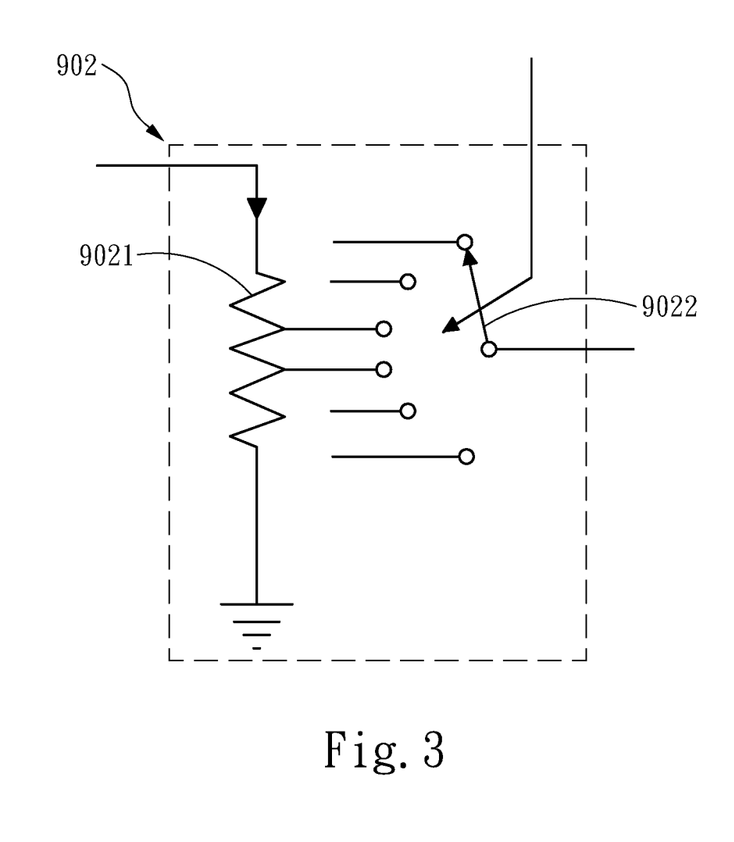
FIG. 3 shows a schematic diagram of an example of the multiplier unit in FIG. 1.

FIG. 1 shows a schematic diagram of an example of power factor correction system in accordance with embodiments of the present invention. The system 900 includes a power factor correction (PFC) circuit 901, a squared divider 902, a compensation unit 903, an amplifier 904, two resistors 905a, 905b, a capacitor 906, an inductor 907 and a transistor 908. FIG. 2 shows an example of the compensation unit 903 and FIG. 3 shows an example of the squared divider 902. The compensation unit 903 includes two capacitors 9031, 9032 and a resistor 9033. The squared divider 902 includes a resistor 9021 and a switch 9022. The squared divider 902 is configured to generate the reciprocal of a voltage.

The PFC circuit may operate by repeated cycles of charging and discharging an inductor. Each operational cycle includes a charging period during which current in the inductor is transferring energy from a power source into the inductor, and a discharging period during which current in the inductor is transferring energy from the inductor to a load.

The charging period and the discharging period of the operational cycle constitute the operational cycle, generally the PFC circuit is operating in either a Continuous Conduction Mode (CCM) or a Boundary Conduction Mode (BCM). In both CCM and BCM, the charging period of each cycle is immediately followed by the discharging period, and the discharging period of an operational cycle is immediately followed by the charging period of the next operational cycle.

In CCM, the current in the inductor does not drop to zero during the operational cycle, while in BCM the current drops to zero at the end of the discharge period of each operational cycle, and then immediately resumes when the charging period of the subsequent operational cycle begins. BCM may be said to operate at the boundary between CCM and Discontinuous Conduction Mode (DCM).

Discontinuous Conduction Mode (DCM) occurs when the operational cycle may include a substantial period during which the inductor is neither being charged or discharged, during which the net inductor current is zero. Thus, in a PFC circuit operating in DCM, each operational cycle includes a charging period, a discharging period, and a zero current period.

Figure 4:
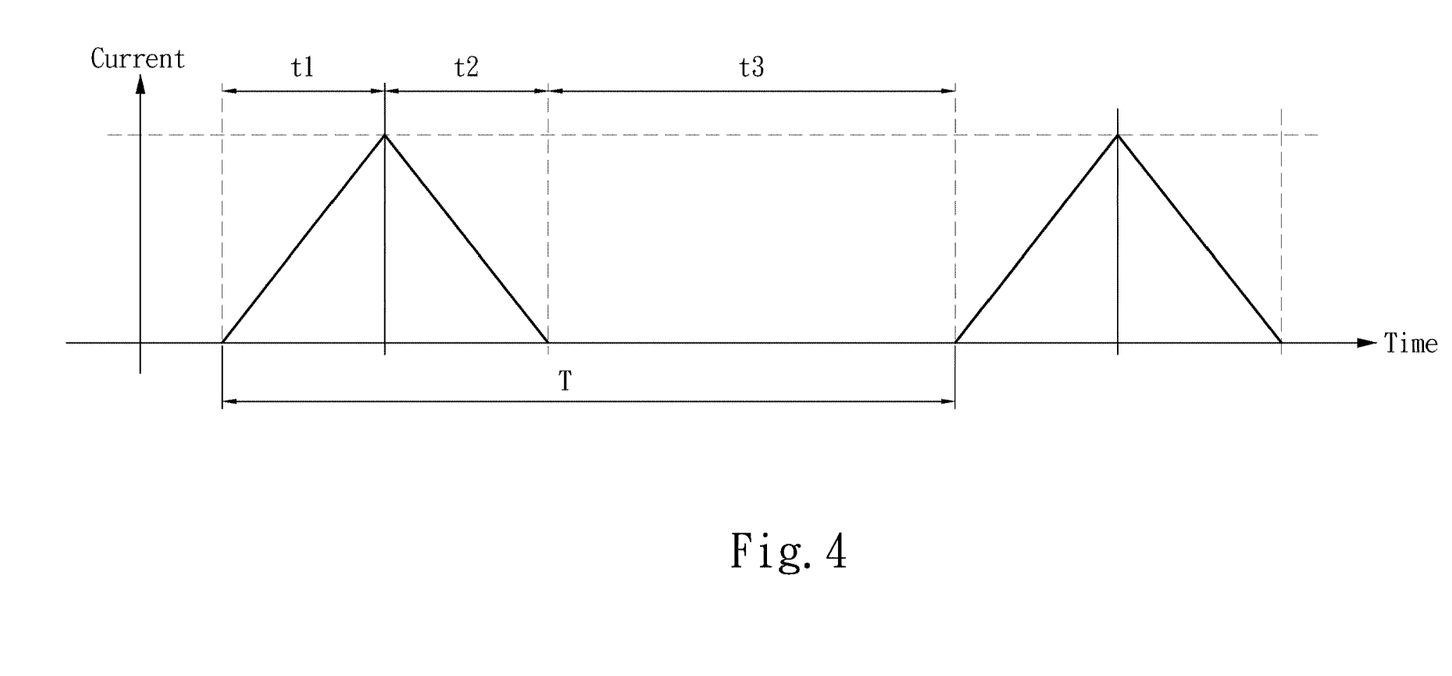
FIG. 4 shows an inductor current in the boost converter.

FIG. 4 shows an inductor current in the boost converter when operating under the DCM. For the boost converter operating in the Critical Conduction Mode (CrM), t3=0 or T=t1+t2. The average input current is calculated from the following expression:

$$I_{IN} = V_{IN}\frac{t_1(t_1+t_2)}{2LT}$$

L is the inductance of the inductor in the boost converter. $I_{IN}$ is the average input current and $V_{IN}$ is the average input voltage.

To achieve the average input current proportional to average input voltage, it is ideally to make $$\frac{t_1(t_1+t_2)}{2T}$$

constant (the inductance of the inductor is assumed to be a constant). That is, $$\frac{t_1(t_1+t_2)}{2T} = C.$$

Then $$t_1 = 2C\frac{T}{t_1+t_2},$$

where T=t1+t2+t3 where t3=0 in CrM or BCM. In practice, however, the value of C involves multiple components in the PFC circuit and may be varied or affected due to the manufacture process even for the same circuit. If the turn-on duration (t1) could be recursively set to take the form of above-mentioned equation, then the power factor correction would be greatly improved.

The purpose of the present invention is to provide a PFC circuit such that the variation of the constant C in the above-mentioned expression could be minimized. That is, the linear relation would be improved and more consistent.

In the present invention, the power factor correction circuit operated under the CrM or DCM is configured to adjust the turn-on duration $T_{on}$ substantially in accordance with the following relationship:

$$T_{on} = \frac{T}{T_{on}+T_{off}}\frac{\text{first parameter}}{\text{second parameter}}$$

The first parameter in numerator includes at least one first process-dependent parameter and the second parameter in denominator includes at least one second process-dependent parameter. For example, the first parameter may be a single process-dependent parameter or multiplication of two or more different process-dependent parameters with or without other factors. Similarly, the second parameter may be a single process-dependent parameter or multiplication of two or more different process-dependent parameters with or without other factors.

The first process-dependent parameter and the second process-dependent parameter are equivalent electrical characteristic associated with different components in the power factor correction circuit. For example, the first process-dependent parameter and the second process-dependent parameter may include a first resistance and a second resistance of different components (a first component and a second component) in the circuit. The resistance may be replaced as capacitance, transconductance coefficient, voltage or the likes.

By following the form of the above relationship, the circuit component factors appear in the numerator and denominator will be equal, such that the influence from the process variation can be minimized.

Figure 5:
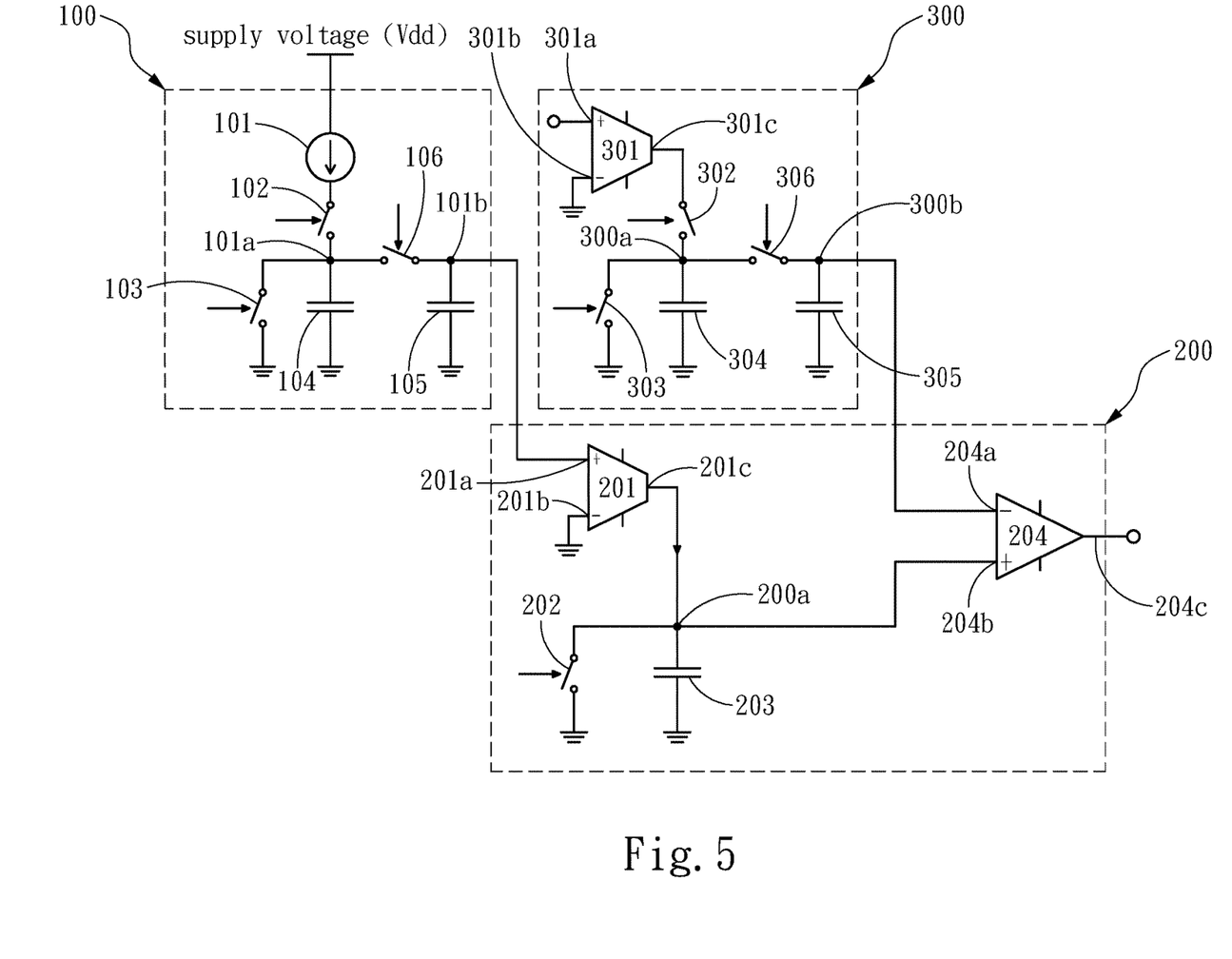
FIG. 5 shows a schematic diagram of an example of power factor correction circuit in accordance with embodiments of the present invention.

FIG. 5 illustrates the PFC circuit according to an embodiment. The PFC circuit includes a voltage converting means 100, a voltage-to-time converting means 200 and a voltage time multiplier 300. In some embodiments of the present invention, the voltage converting means 100 is a time to voltage converter.

The voltage converting means 100 is configured to convert a supply voltage based on a time period of a turn-on duration $T_{on}$ and a turn-off duration $T_{off}$ of the boost converter into an output voltage. In the present embodiment, the voltage converting means 100 comprises a first current source 101, a first switch 102, a first reset switch 103, a first capacitor 104, a first holding capacitor 105, and a first sampling switch 106. The first current source 101 is configured to receive a supply voltage (Vdd) and generate a constant output current. The first switch 102 is coupled with the first current source 101, which is controlled by a control signal causing the first switch 102 to be closed for the turn-on duration $T_{on}$ and the turn-off duration $T_{off}$. The first reset switch 103 is coupled with the first switch 102, which is driven by a reset signal. The first capacitor 104 is coupled with the first switch 102. The first holding capacitor 105 is coupled with a node 101a between the first switch 102, the first reset switch 103 and the first capacitor 104. The first reset switch 103, the first capacitor 104 and the first holding capacitor 105 are connected in parallel. The first sampling switch 106 is coupled between the node 101a and the first holding capacitor 105 (a node 101b). The first sampling switch 106 is driven by a sampling signal.

The voltage-to-time converting means 200 comprises a second operational transconductance amplifier 201, a third reset switch 202, a third capacitor 203, and a first comparator 204. The second operational transconductance amplifier 201 has a non-inverting input 201a, an inverting input 201b and an output 201c. The non-inverting 201a is coupled to the output voltage on the node 101b and the inverting input 201b is connected to ground. The third reset switch 202 is coupled with the output 201c of the second operational transconductance amplifier 201. The third capacitor 203 is coupled with a node 200a between the output 201c and the third reset switch 202. The first comparator 204 has a non-inverting input 204a, an inverting input 204b and an output 204c. The inverting input 204b is coupled with the node 200a.

The voltage time multiplier 300 comprises a first operational transconductance amplifier 301, a second switch 302, a second reset switch 303, a second capacitor 304, a second holding capacitor 305 and a second sampling switch 306. The first operational transconductance amplifier 301 has a non-inverting input 301a, an inverting input 301b and an output 301c. The non-inverting input 301a is configurated to receive an error voltage from the output of the squared divider 902 as shown in FIG. 1. The inverting input 301b is connected to ground. The second switch 302 is coupled with the output 301c, which is driven by the control signal to turn on the second switch 302 for the duration T. The second reset switch 303 is coupled with the second switch 302, which is driven by the reset signal. The second capacitor 304 is coupled with a node 300a between the second switch 302 and the second reset switch 303. The second sampling switch 306 is coupled to the node 300a, which is driven by the sampling signal. The second holding capacitor 305 is coupled with the second sampling switch 306. The non-inverting input 204a is coupled with a node 300b between the second sampling switch 306 and the second holding capacitor 305. The output 204c of the first comparator 204 generates an on-time control signal having the turn-on duration $T_{on}$.

In this embodiment, the power factor correction circuit operated under the CrM or DCM is configured to adjust the turn-on duration $T_{on}$ substantially in accordance with the following relationship:

$$T_{on} = \frac{T}{T_{on} + T_{off}} \frac{C_3 C_1 V_{EA} G_{m1}}{G_{m2} I_1 C_2}$$

$C_1$ represents capacitance of the first capacitor 104, $C_2$ represents capacitance of the second capacitor 304, $C_3$ represents capacitance of the third capacitor 203, $V_{EA}$ represents the error voltage coming from the squared divider 902, $I_1$ represents current of the output current 101, $G_{m1}$ represents transconductance coefficient of the first operational transconductance amplifier 301, and $G_{m2}$ represents transconductance coefficient of the second operational transconductance amplifier 201.

Figure 6:
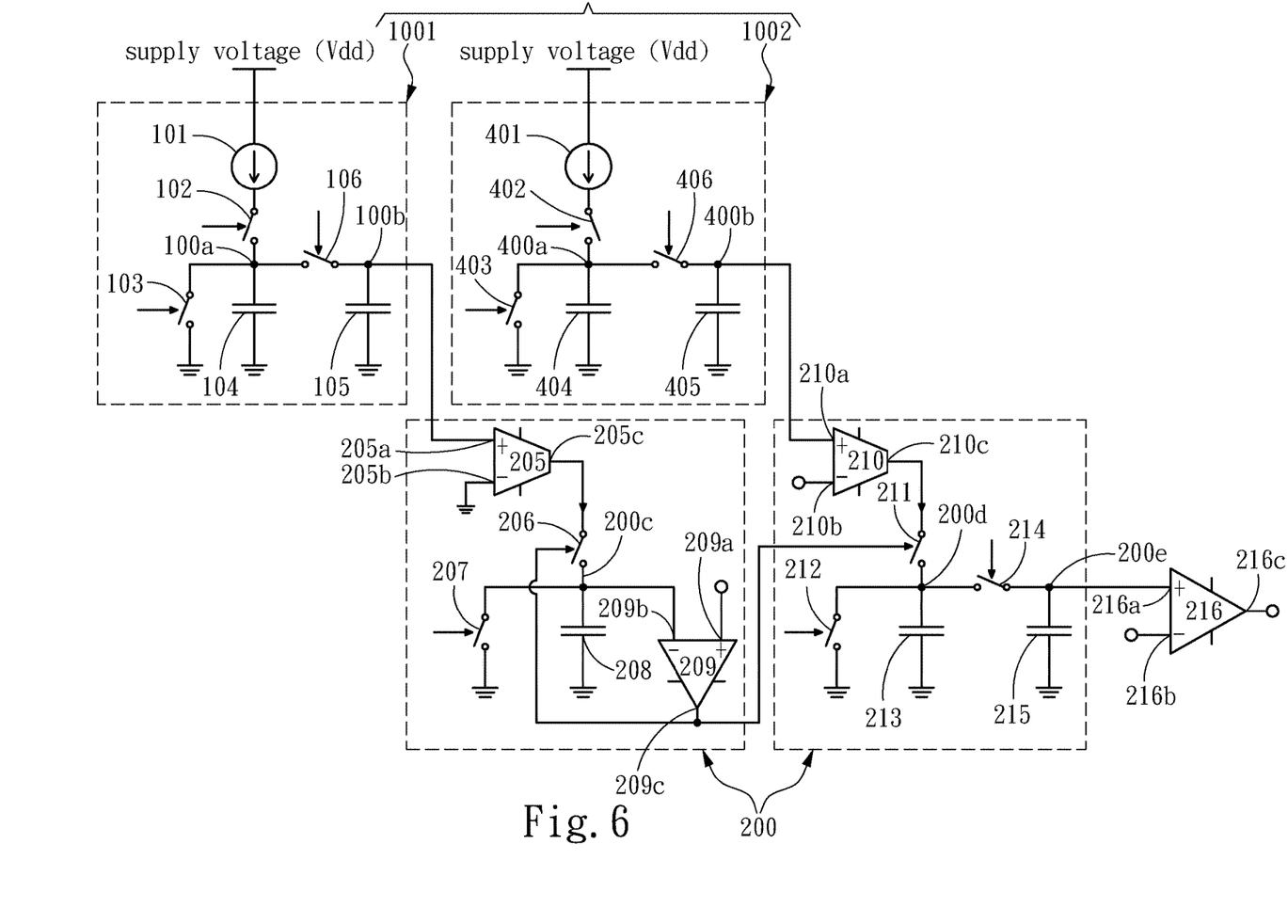
FIG. 6 shows a schematic diagram of an example of power factor correction circuit in accordance with embodiments of the present invention.

FIG. 6 illustrates the PFC circuit according to an embodiment. The PFC circuit includes a voltage converting means 100 and a voltage-to-time converting means 200. In some embodiments of the present invention, the voltage converting means 100 is a time to voltage converter.

The voltage converting means 100 comprises a first converting unit 1001 and a second converting unit 1002. The first converting unit 1001 comprises a first current source 101, a first switch 102, a first reset switch 103, a first capacitor 104, a first sampling switch 106 and a first holding capacitor 105. The first current source 101 is configured to receive a supply voltage (Vdd) and generate a first constant output current. The first switch 102 is coupled with the first current source 101, which is controlled by a control signal causing the first switch 102 to be closed for the turn-on duration $T_{on}$ and the turn-off duration $T_{off}$. The first reset switch 103 is coupled with the first switch 102, which is driven by a reset signal. The first capacitor 104 is coupled with the first switch 102. The first sampling switch 106 coupled to a node 100a between the first switch 102, the first reset switch 103 and the first capacitor 104, which is driven by a sampling signal. The first holding capacitor 105 is coupled with the first sampling switch 106. The first reset switch 103, the first capacitor 104 and the first holding capacitor 105 are connected in parallel.

The second converting unit 1002 comprises a second current source 401, a fourth switch 402, a fourth reset switch 403, a fourth capacitor 404, a third sampling switch 406 and a second holding capacitor 405. The second current source 401 is configured to receive a supply voltage (Vdd) and generate a second constant output current. The fourth switch 402 is coupled with the second current source 401, which is driven by the control signal to turn on the switch for the duration T. The fourth reset switch 403 is coupled with the fourth switch 402, which is driven by the reset signal. The fourth capacitor 404 is coupled with the fourth switch 402. The third sampling switch 406 is coupled to a node 400a between the fourth switch 402, the fourth reset switch 403 and the fourth capacitor 404, which is driven by the sampling signal. The second holding capacitor 405 is coupled with the third sampling switch 406. The fourth reset switch 403, the fourth capacitor 404 and the second holding capacitor 405 are connected in parallel.

The voltage-to-time converting means 200 comprises a third operational transconductance amplifier 205, a fifth switch 206, a fifth reset switch 207, a fifth capacitor 208, a second comparator 209, a fourth operational transconductance amplifier 210, a sixth switch 211, a sixth reset switch 212, a sixth capacitor 213, a fourth sampling switch 214, a fourth holding capacitor 215 and a third comparator 216.

The third operational transconductance amplifier 205 has a non-inverting input 205a, an inverting input 205b and an output 205c. The non-inverting input 205a is coupled to the node 100b between the first sampling switch 106 and the first holding capacitor 105. The inverting input 205b is connected to ground. The fifth switch 206 is coupled with the output 205c. The fifth reset switch 207 is coupled with the fifth switch 206. The fifth capacitor 208 is coupled with a node 200c between the fifth switch 206 and the fifth reset switch 207. The second comparator 209 has a non-inverting input 209a, an inverting input 209b and an output 209c. The non-inverting input 209a is coupled with an error voltage. The inverting input 209b is coupled with the node 200c. The output 209c generates a signal to drive the fifth switch 206.

The fourth operational transconductance amplifier 210 has a non-inverting input 210a, an inverting input 210b and an output 210c. The non-inverting input 210a is coupled to the node 400b between the third sampling switch 406 and the second holding capacitor 405. The inverting input 210b is connected to ground. The sixth switch 211 is coupled with the output 210c, which is driven by the control signal output from the second comparator 209. The sixth reset switch 212 is coupled with the sixth switch 211, which is driven by the reset signal. The sixth capacitor 213 is coupled with a node 200d between the sixth switch 211 and the sixth reset switch 212. The fourth sampling switch 214 is coupled to the node 200d, which is driven by the sampling signal. The fourth holding capacitor 215 is coupled with the fourth sampling switch 214. The sixth reset switch 212, the sixth capacitor 213 and the fourth holding capacitor 215 are connected in parallel. The third comparator 216 has a non-inverting input 216a, an inverting input 216b and an output 216c. The non-inverting input 216a is coupled with a node 200e between the fourth sampling switch 214 and the fourth holding capacitor 215. The inverting input 216b is coupled with a saw-tooth voltage. The output 216c generates an on-time control signal having the turn-on duration $T_{on}$.

Figure 7:
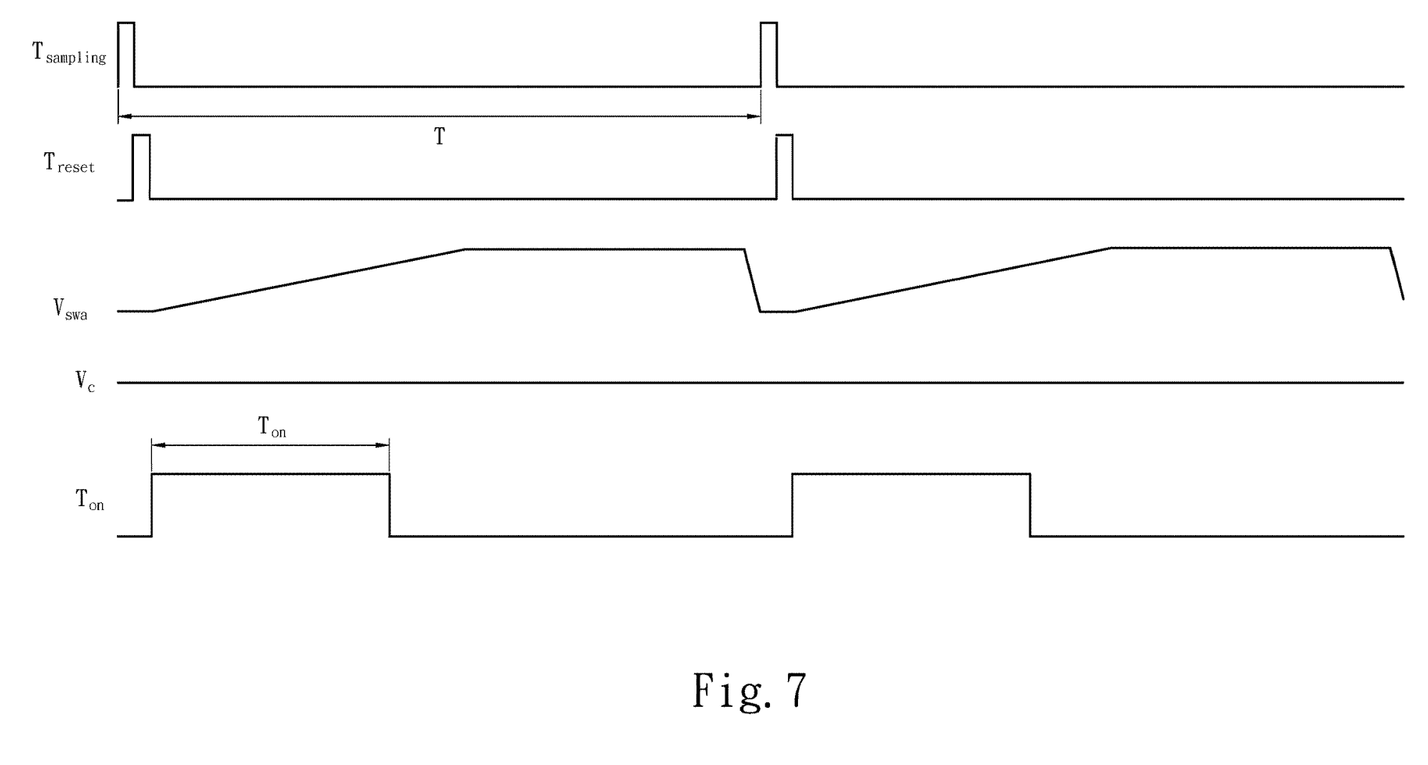
FIG. 7 shows a schematic diagram of waveform in the circuit of FIG. 6.

The waveform at the sampling switch, the reset switch, the saw-tooth voltage, the voltage ($V_c$) at the node 200d and the turn-on duration $T_{on}$ is shown in FIG. 7.

In this embodiment, the power factor correction circuit operated under the CrM or DCM is configured to adjust the turn-on duration $T_{on}$ substantially in accordance with the following relationship:

$$T_{on} = \frac{T}{T_{on} + T_{off}} \frac{C_1 C_5 G_{m4} I_2 V_{EA}}{C_4 C_6 G_{m3} I_1 K}$$

$C_1$ represents capacitance of the first capacitor 104, $C_4$ represents capacitance of the fourth capacitor 404, $C_5$ represents capacitance of the fifth capacitor 208, $C_6$ represents capacitance of the sixth capacitor 213, $V_{EA}$ represents the error voltage coming from the squared divider 902, $I_1$ represents current of the first output current 101, $I_2$ represents current of the second output current 401, $G_{m3}$ represents transconductance coefficient of the third operational transconductance amplifier 205, and $G_{m4}$ represents transconductance coefficient of the fourth operational transconductance amplifier 210, and K represents slope of the voltage ramp of the saw-tooth voltage.

Figure 8:
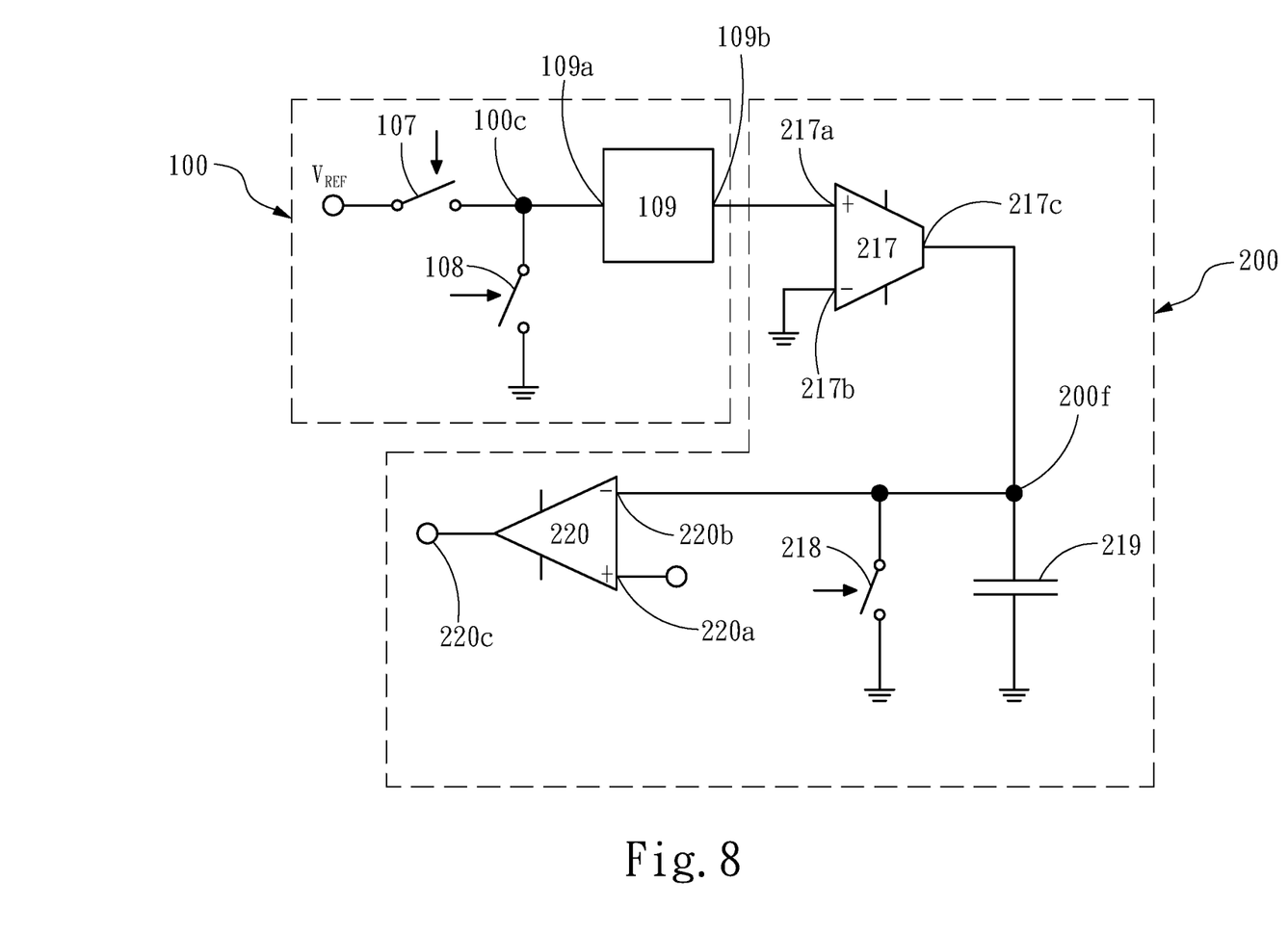
FIG. 8 shows a schematic diagram of an example of power factor correction circuit in accordance with embodiments of the present invention.

FIG. 8 illustrates the PFC circuit according to an embodiment. The PFC circuit includes a voltage converting means 100 and a voltage-to-time converting means 200.

The voltage converting means 100 comprises a seventh switch 107, an eighth switch 108 and a filter 109. The seventh switch 107 is configured to receive a reference voltage $V_{ref}$ and is controlled by a control signal causing the seventh switch 107 to be closed for the turn-on duration $T_{on}$ and the turn-off duration $T_{off}$. The reference voltage may be generated based on the supply voltage. The eighth switch 108 is coupled with the seventh switch 107, which is driven by a second control signal inversely proportional to the first control signal. The filter 109 has an input 109a and an output 109b. The input 109a is coupled with a node 100c between the seventh switch 107 and the eighth switch 108.

The voltage-to-time converting means 200 comprises a fifth operational transconductance amplifier 217, a ninth switch 218, an eighth capacitor 219 and a fourth comparator 220. The fifth operational transconductance amplifier 217 has a non-inverting input 217a, an inverting input 217b and an output 217c. The non-inverting input 217a is coupled to the output 109b of the filter 109. The inverting input 217b is connected to ground. The ninth switch 218 is coupled with the output 217c. The eighth capacitor 219 is coupled between the output 217c and the ninth switch 218. The fourth comparator 220 has a non-inverting input 220a, an inverting input 220b and an output 220c. The inverting input 220b is coupled with a node 200f between the ninth switch 218, the eighth capacitor 219 and the output 217c. The non-inverting input 220a is coupled with an error voltage. The output of the fourth comparator 220 generates an on-time control signal having the turn-on duration $T_{on}$.

In this embodiment, the power factor correction circuit operated under the CrM or DCM is configured to adjust the turn-on duration $T_{on}$ substantially in accordance with the following relationship:

$$T_{on} = \frac{T}{T_{on} + T_{off}} \frac{C_8 V_{EA}}{G_{m5} V_{REF}}$$

$C_8$ represents capacitance of the eighth capacitor 219, $V_{EA}$ represents the error voltage, $G_{m5}$ represents transconductance coefficient of the fifth operational transconductance amplifier 217, and $V_{REF}$ represents the reference voltage.

Figure 9:
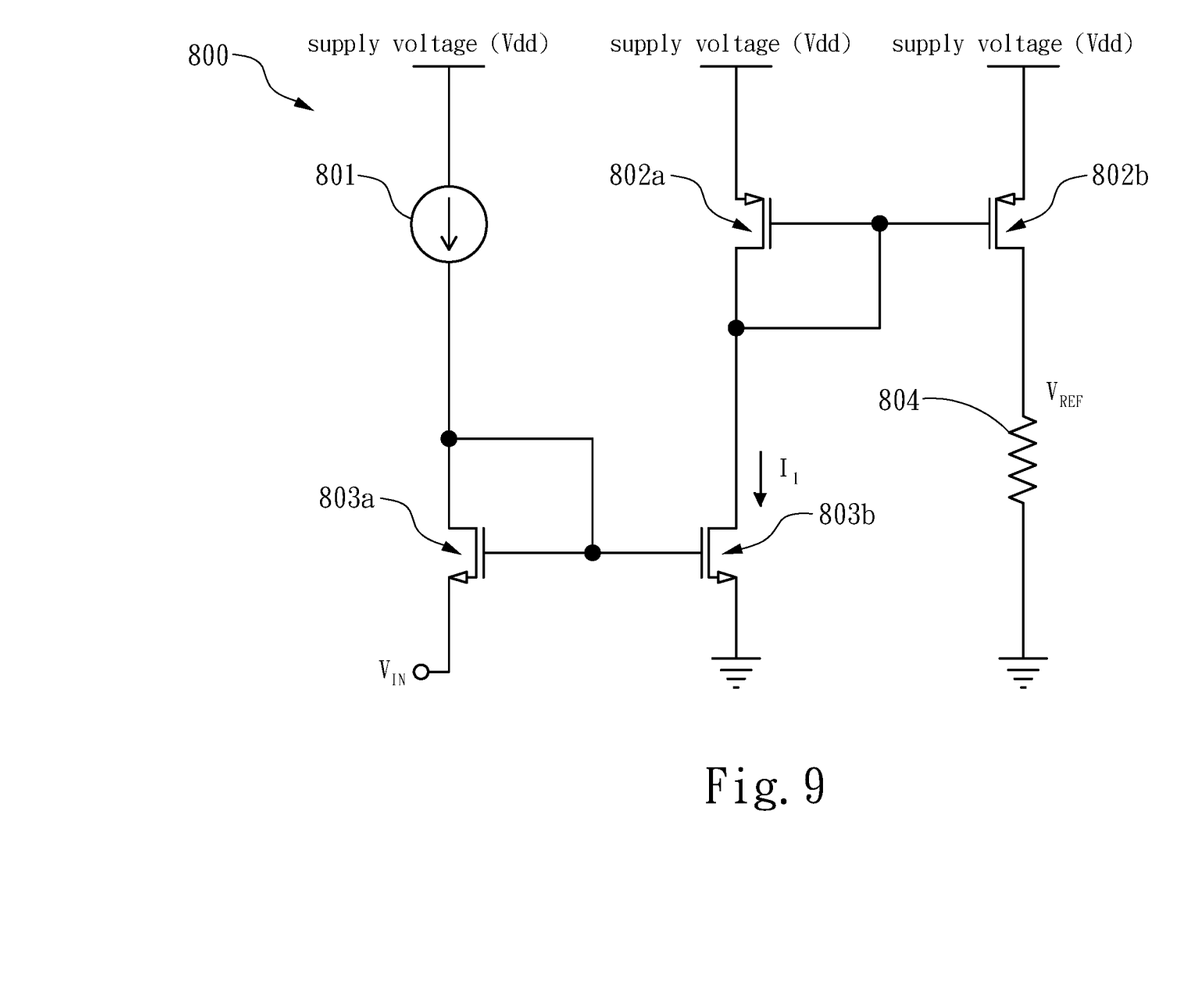
FIG. 9 shows a schematic diagram of an example of circuit for generating the reference voltage in accordance with embodiments of the present invention.

FIG. 9 shows a schematic diagram of an example of a circuit 800 for generating the reference voltage in accordance with embodiments of the present invention, which may be used to input to the circuit of FIG. 8. In some embodiments, the circuit may replace the squared divider 902 in FIG. 1 when used together with the circuit of FIG. 8. The circuit 800 includes a current source 801, two P-type transistors 802a, 802b, two N-type transistors 803a, 803b, and a resistor 804.

The sensed input voltage ($V_{IN}$) is input to a source input of the N-type transistor 803a. The N-type transistor 803a has a large W/L, so Vgs is closed to Vth. $I_1$ could be obtained from the following equation:

$$I_1 = \beta \frac{W_2}{L_2}(V_{IN} + V_{TH} - V_{TH})^2 = \beta \frac{W_2}{L_2} V_{IN}^2$$

The N-type transistor 803b has a large W and a large L. Hence, the N-type transistor 803 follows the square law behavior. $V_{REF}$ could be obtained from the following equation:

$$V_{REF} = R\beta \frac{W_2}{L_2} V_{IN}^2$$

When the reference voltage $V_{REF}$ is used in the relation obtained from the circuit in FIG. 8, we can get the $V_{IN}^2$ term in the denominator which is the purpose of the squared divider 902 in FIG. 1.

The power factor correction circuit of the present invention is designed to be able to follow the form of the above-mentioned relationship, the circuit component factors appear in the numerator and denominator are of same electrical characteristic (equivalent circuit parameters) in different circuit components such that the influence from the process variation can be minimized. In addition, the power factor correction circuit of the present invention does not need a feedback path. Without addition of the feedback path, the stability of the circuit could be improved and the compensation work is avoided.

What is claimed is:

1. A power factor correction circuit comprising:
a power circuit including an input terminal coupled to an output terminal via an inductor, wherein the input terminal is configured to receive a rectified input voltage from an AC source and the output terminal is configured to deliver a regulated DC output voltage to a load, the power circuit further including a control switch coupled between the inductor and a ground wherein the control switch has an on time during which current in the inductor increases, an off time during which current in the inductor decreases and a dead time during which current in the inductor remains substantially constant;
a voltage to time conversion circuit that receives a reference voltage and outputs a DC voltage proportional to a sum of the on time and the off time of the control switch, divided by, a sum of the on time, the off time and the dead time of the control switch; and
a control circuit that receives the DC voltage and controls the on time of the control switch proportional to the DC voltage.

2. The power factor correction circuit of claim 1 wherein the control circuit further comprises a diode connected between the inductor and the output terminal, and a capacitor connected between the output terminal and the ground, wherein the control switch is coupled to the inductor and the diode.

3. The power factor correction circuit of claim 1 wherein the voltage to time conversion circuit includes a first switch that is on during a time period equal to the on time plus the off time and a second switch that is on when the first switch is off.

4. The power factor correction circuit of claim 1 wherein the current in the inductor is substantially zero during the dead time.

5. The power factor correction circuit of claim 1 wherein the rectified input voltage is power factor corrected to have a power factor substantially equal to 1.

6. The power factor correction circuit of claim 1 wherein the reference voltage is proportional to a square of the rectified input voltage.

7. A power factor correction circuit comprising:
a power circuit including an input terminal coupled to an output terminal via an inductor, wherein the input terminal is configured to receive a rectified input voltage from an AC source and the output terminal is configured to deliver a regulated DC output voltage to a load, the power circuit further including a control switch coupled between the inductor and a ground wherein the control switch has an on time during which current in the inductor increases, an off time during which current in the inductor decreases and a dead time during which current in the inductor remains substantially constant; and
a control circuit that controls the on time of the control switch proportional to a sum of the on time and the off time of the control switch, divided by, a sum of the on time, the off time and the dead time of the control switch.

8. The power factor correction circuit of claim 7 wherein the control circuit further comprises a diode connected between the inductor and the output terminal, and a capacitor connected between the output terminal and the ground, wherein the control switch is coupled to the inductor and the diode.

9. The power factor correction circuit of claim 7 further comprising a first switch that is on during a time period equal to the on time plus the off time and a second switch that is on when the first switch is off.

10. The power factor correction circuit of claim 7 wherein the current in the inductor is substantially zero during the dead time.

11. The power factor correction circuit of claim 7 wherein the rectified input voltage is power factor corrected to have a power factor substantially equal to 1.

12. The power factor correction circuit of claim 7 further comprising a voltage to time conversion circuit that receives a reference voltage and outputs a DC voltage proportional to a sum of the on time and the off time of the control switch, divided by, a sum of the on time, the off time and the dead time of the control switch.

13. The power factor correction circuit of claim 12 wherein the reference voltage is proportional to a square of the rectified input voltage.

14. A method of operating a power factor correction circuit, the method comprising:
receiving, at an input terminal of a power circuit, a rectified input voltage from an AC source;
delivering, at an output terminal of the power factor correction circuit, a regulated DC output voltage to a load;
controlling the regulated DC output voltage with a control switch that controls a current in an inductor, wherein the inductor is coupled between the input terminal and the output terminal, and wherein the control switch has an on time during which current in the inductor increases, an off time during which current in the inductor decreases and a dead time during which current in the inductor remains substantially constant; and
controlling the on time of the control switch proportional to a sum of the on time and the off time of the control switch, divided by, a sum of the on time, the off time and the dead time of the control switch.

15. The method of claim 14 wherein the power circuit further comprises a diode connected between the inductor and the output terminal, and a capacitor connected between the output terminal and a ground, wherein the control switch is coupled to the inductor and the diode.

16. The method of claim 14 wherein the power circuit further comprises a voltage to time conversion circuit having a first switch that is on during a time period equal to the on time plus the off time and a second switch that is on when the first switch is off.

17. The method of claim 14 wherein the current in the inductor is substantially zero during the dead time.

18. The method of claim 14 wherein the rectified input voltage is power factor corrected to have a power factor substantially equal to 1.

19. The method of claim 14 wherein the power factor correction circuit further comprises a voltage to time conversion circuit that receives a reference voltage and outputs a DC voltage proportional to a sum of the on time and the off time of the control switch, divided by, a sum of the on time, the off time and the dead time of the control switch.

20. The method of claim 19 wherein the reference voltage is proportional to a square of the rectified input voltage.

* * * * *